Dec. 3, 1957 J. P. LAWLOR 2,814,950
FLOW INDICATOR FOR FILTER APPARATUS
Filed April 20, 1955
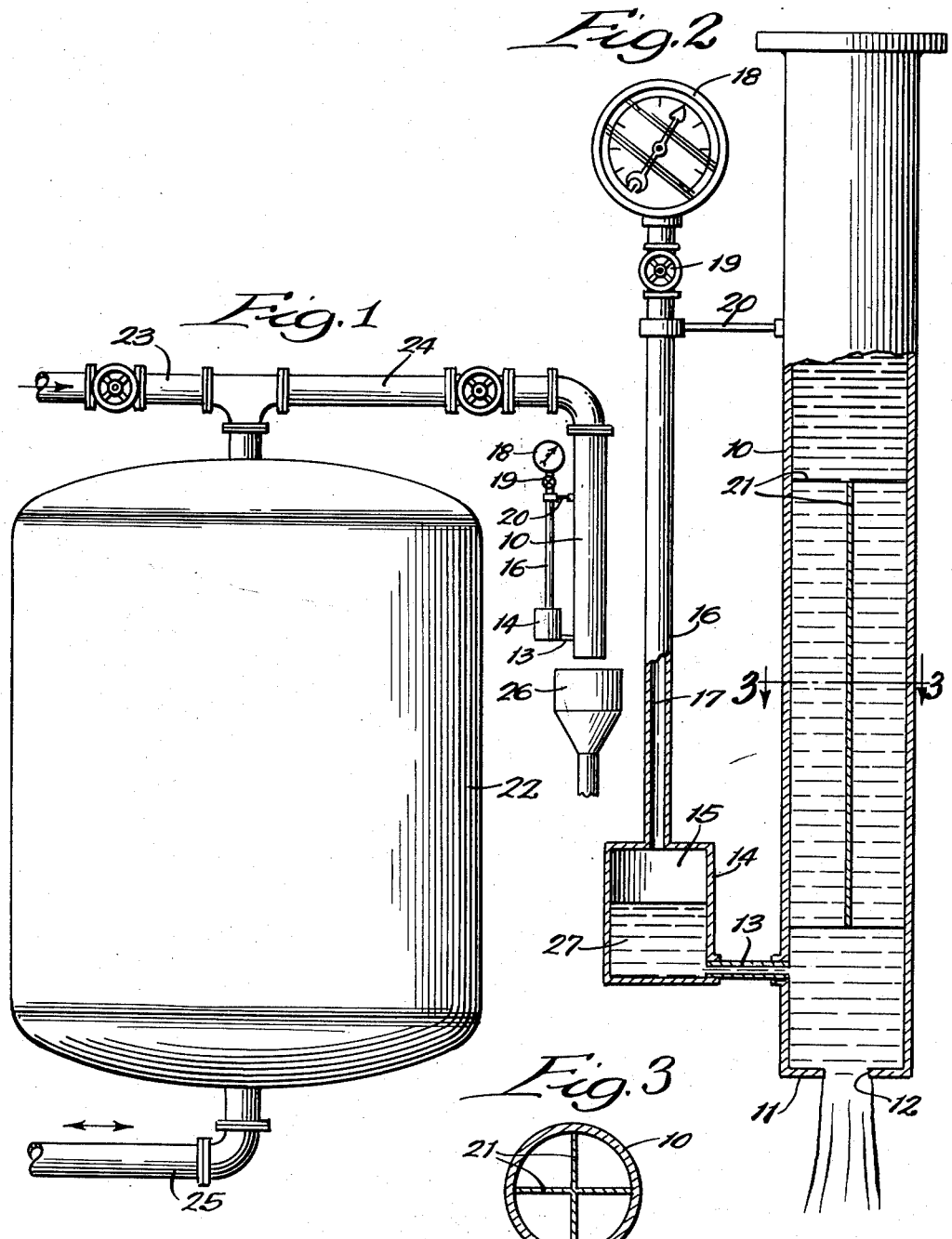
INVENTOR:
Joseph P. Lawlor,
BY
Dawson & Orms
ATTORNEYS.

2,814,950

FLOW INDICATOR FOR FILTER APPARATUS

Joseph P. Lawlor, Ames, Iowa

Application April 20, 1955, Serial No. 502,656

1 Claim. (Cl. 73—216)

This invention relates to a flow indicator device, and more particularly to a device for measuring the rate of flow in discharging water or other liquid to the atmosphere by means of a pipe having a discharge orifice. The invention is particularly useful in measuring the rate of flow when discharging backwash water in the operation of backwashing a filter.

This application constitutes a continuation-in-part of my copending patent application, Serial No. 227,206, filed May 19, 1951, now abandoned.

In flow indicator devices heretofore employed it has been common to use mercury or other means such as special spring bellows or glass tubing, etc., such structures being expensive and requiring maintenance costs, and in one common device involving the loss of mercury, etc. Further, difficulties are presented in the draining of the apparatus and in the attention that has to be given to the apparatus after each measuring operation.

Special problems are created in the use of flow indicator devices in filter apparatus, especially where the filter apparatus is one that is cleaned in a backwash operation and wherein the flow indicator devices are employed to measure the flow rate of backwash fluid discharging from the filter apparatus. In such filter apparatus it is common to employ a tank having one or more filter beds positioned therein. The filter beds may be composed of loose granular material, such as diatomaceous earth. Water to be purified is run through the tank and the filter beds therein in one direction and as the water filters through the beds the contaminants are extracted from the water and collect in the filter bed.

To clean such filters it is desirable to remove the foreign matter from the filter beds without disturbing the character of the filter beds, for it takes a considerable period of time and the exercise of care in building up these beds. Cleaning of the filter beds can be carried out by reversing the flow of liquid through the filter beds and by carefully controlling the flow rate of the backwash liquid. It will be appreciated that this liquid which is being discharged from the tank or from the filter apparatus carries a considerable quantity of particulate matter that has been dislodged and carried from the filter beds. The particulate matter in the backwash liquid has been found to disturb the accurate operation of flow indicator devices used to measure the rate of flow for some of the particulate matter settles out of the backwash water and collects in the flow indicator devices thereby upsetting the operation thereof.

An object of the present invention is to provide a flow indicator which operates automatically and which drains itself after each operation, requiring no effort or special attention of the operator. A further object is to provide a dependable, foolproof device for measuring the rate of flow through a discharge orifice and involving substantially no maintenance expense. A still further object is to provide a highly efficient flow indicator requiring a minimum of apparatus and no moving parts except for the parts of a standard pressure gauge or altitude gauge. Yet another object is to provide a flow indicating device having an expansion chamber containing an air cushion reflecting any drop in pressure between the orifice and the indicator gauge while at the same time permitting an automatic draining of the device when the indicator is not in operation.

A further object of the invention is in the provision of a flow indicator device useful with filter apparatus and especially for measuring the flow rate of backwash liquid that is characterized by being self-flushing whereby foreign matter collecting therein is flushed automatically from the device at the termination of a backwashing operation. Still a further object is in providing a flow indicator device having a flow tube of reduced cross section communicating with a vertical pipe section that carries backwash liquid from a filter operation, the vertical pipe section having a restricted area therein that may be in the form of a discharge orifice that is effective to create a pressure head within the pipe section proportionate to the flow rate of backwash liquid therethrough, the flow tube communicating with the pipe section at an elevation above the restriction and communicating also at the lower end of an enlarged chamber that at its upper end is equipped with an air pressure gauge, the size of the chamber being considerably greater than that of the flow tube and being related to the size of the restriction so that a substantial volume of liquid is provided in the chamber even during minimum flow rates of backwash liquid through the pipe section. Other specific objects and advantages will become apparent as this specification proceeds.

The invention is shown in an illustrative embodiment, by the accompanying drawing, in which—

Figure 1 is a broken side view in elevation of apparatus with which the flow indicator device may be employed; Fig. 2, an enlarged elevational view of the flow indicator apparatus, a portion of the apparatus being shown in section; and Fig. 3, a transverse sectional view, the section being taken as indicated at line 3—3 of Fig. 2.

In the illustration given, 10 designates a discharge pipe or column having a restricted or partially closed bottom 11 provided by a discharge orifice 12. A connecting pipe or flow tube 13 joins the column 10 above the orifice 12 with a casing 14 providing an expansion chamber 15. A casing pipe 16 provides an air column 17 communicating with the top of expansion chamber 15. The pipe 16 is provided at its top with a pressure gauge 18 which, for the purposes herein, may be an ordinary or standard altitude gauge which reflects the pressure of the air within column 17. The pipe 16 may be provided with a hand-operated valve 19. The pipe may be, if desired, supported by the brace 20 connected to the pipe 10.

In order to keep the water from surging inside of pipe 10, the pipe may be equipped with straightening vanes 21, but such vanes may, if desired, be omitted.

The flow indicator device may be used with various types of apparatus and in various positions for indicating the rate of flow through a vertical pipe. For the purpose of illustration, the indicator is shown in Figs. 1 and 2 applied to water filter apparatus. In the apparatus shown, 22 designates the filter equipped with a raw water inlet 23 and with a backwash discharge pipe 24. Pipe 10, which has already been described, communicates with the valve-controlled backwash discharge pipe or conduit 24. The pipe 25 serves as an outlet for filtered water and also, in the backwashing operation, as an inlet for the water which is to be used in the backwashing operation. The pipe 10 discharges through its orifice 12 into a sump, pit or other receptacle 26. It will be understood that the water filter apparatus may be varied considerably. The pipes 23 and 24 may lead from a point below the top of the filter 22 and the pipe 25 may similarly lead from a point well above the bottom of the filter. The flow indicator may be employed with any of the flow lines instead of the discharge pipe illustrated.

*Operation*

In the operation of the apparatus shown, water is discharged through the pipe 10 and through the orifice 12. The flow of water, in very large quantities, through the pipe 10 causes a back flow of water into the expansion chamber 14 and traps air within the chamber and column 17. In the expansion chamber, the water column is indicated by the numeral 27 and the space thereabove is filled with air which is compressed by the rising water column 27. The pressure exerted by the water in expansion chamber 15 against the air in column 17 actuates the indicator gauge 18, producing a reading which shows the head loss created by orifice 12. By properly graduating the indicator gauge 18, the rate of flow of water through orifice 12 will be accurately indicated on the gauge.

In the above operation, the flow through the orifice plate, which is preferably formed of stainless steel, produces a pressure or head which is transmitted into the expansion chamber 15, the dimensions of the chamber being such that the pressure head will fill the chamber preferably about one-half full of water. The orifice pressure is thus transmitted to the indicator gauge by air pressure only, the air column 17 above the water body 27 acting as a snubber for the flow indicator gauge 18.

The above device can be built into any diameter of discharge pipe, the most common sizes ranging from two-inch up to twelve-inch pipe.

When the discharge of water has been discontinued, the water automatically drains from the expansion chamber 15 and the entire apparatus, including pipes 10 and the casing 14, thus contains no water. When, however, water is again discharged in large quantities through pipe 10, water flows again into expansion chamber 15 and traps air therein, the following operation being as already described above.

The backwash liquid flowing through the conduit 24 and into the vertical pipe section 10 thereof carries a considerable quantity of particulate matter and other foreign bodies that have been dislodged from the filter beds within the tank or container 22. Such beds have not been illustrated in the drawing for filter apparatus of such character is well known in the art and need not be described or illustrated for purposes of disclosing the present invention. As the backwash liquid flows through the tube 13 and into the chamber 15 it carries with it a substantial amount of particulate matter. It is noted that the flow tube 13 has a restricted cross section and is substantially smaller than both the chamber 15 and pipe section 10. The small diameter of the flow tube tends to minimize the flow of particulate matter into the chamber 15 but by no means completely eliminates the flow of such foreign matter thereinto. Once the backwash liquid has entered the chamber 15, the volume therein stays fairly constant and is relatively quiescent. Therefore, the particulate matter tends to settle out of the liquid and collect along the bottom of the chamber 15.

However, because the size or capacity of the chamber 15 is related to the size of the restriction or orifice 12 so that a substantial volume of liquid is within the chamber 15 even during minimum flow rates of the backwash liquid through the pipe section 10, when a backwash operation is terminated the liquid within the chamber 15 flows outwardly therefrom and through the tube 13 and into the pipe section 10. This flow of liquid is effective to flush the particulate matter from the chamber and flow tube and thus keep them clean and clear at all times so that the flow indicator device operates accurately and effectively.

In the foregoing apparatus, it will be noted that no moving parts are required except for the parts of an ordinary altitude gauge. Open pipe connections are employed which automatically drain themselves. There is no mercury to lose nor is glass tubing, spring bellows or other devices of this character needed.

While in the foregoing specification I have set forth a specific structure in considerable detail for the purpose of illustrating a specific embodiment of the invention, it will be understood that such details of structure may be varied widely by those skilled in the art without departing from the spirit of my invention.

I claim:

A flow indicator combination adapted for measuring backwash rates from a filter apparatus, comprising a generally vertical pipe section having an outlet at its lower end discharging to the atmosphere and an inlet at its upper end for receiving said backwash, a restriction within said pipe section for creating a pressure head thereabove proportionate to the rate of flow of said backwash, a flow tube extending laterally from said pipe section and communicating therewith above and adjacent said restriction, a casing providing a vertically-extending chamber beside said pipe section, the outer end of said flow tube communicating with the lower portion of said chamber, an air pipe extending upwardly from the upper portion of said chamber, and an air pressure gauge having a measuring element in communication with the upper portion of said air pipe above said chamber, said chamber having a relatively large cross sectional area compared to said flow tube and compared to said air pipe.

References Cited in the file of this patent

UNITED STATES PATENTS

| 768,014 | Marsh | Aug. 16, 1904 |
| 2,028,273 | Clausen | Jan. 21, 1936 |
| 2,283,906 | Bennett | May 26, 1942 |
| 2,336,209 | Anderson | Dec. 7, 1943 |

FOREIGN PATENTS

| 797,070 | France | Feb. 3, 1936 |
| 242,038 | Germany | Dec. 19, 1911 |
| 965,825 | France | Feb. 22, 1950 |